United States Patent [19]

Amiot et al.

[11] Patent Number: 5,460,422
[45] Date of Patent: Oct. 24, 1995

[54] SYSTEM FOR THE TILTING OF A SUSPENDED OBJECT WITH TENSIONING ROLLER FOR SUSPENSION LINE

[75] Inventors: Bernard Amiot, Pierrefitte Sur Sauldre; Gilles Doisneau, Meug Sur Loire; Jean-Pierre Frehaut, Versailles; Serge Morin, Paris, all of France

[73] Assignee: Thomson-Brandt Armements, Saint Aubin, France

[21] Appl. No.: 369,081

[22] Filed: Jan. 5, 1995

Related U.S. Application Data

[62] Division of Ser. No. 999,352, Dec. 31, 1992, Pat. No. 5,398,613.

[30] Foreign Application Priority Data

Jan. 10, 1992 [FR] France ................................ 92 00206

[51] Int. Cl.⁶ .......................... F42B 10/56; B66C 13/04
[52] U.S. Cl. .................... 294/1.1; 102/387; 294/81.4; 294/82.12
[58] Field of Search ................. 294/1.1, 67.5, 294/82.12, 82.16, 82.25, 81.3, 81.4, 86.41; 102/306, 386, 387, 476; 244/138 R, 142

[56] References Cited

U.S. PATENT DOCUMENTS

| | | | |
|---|---|---|---|
| 3,191,983 | 6/1965 | Gaglione | 294/81.3 |
| 3,675,960 | 7/1972 | Mangold | 294/81.3 |
| 3,789,998 | 2/1974 | Fathauer et al. | 294/81.4 X |
| 5,003,882 | 4/1991 | Frehaut et al. | 102/387 |

FOREIGN PATENT DOCUMENTS

| | | | |
|---|---|---|---|
| 2470749 | 6/1981 | France | 294/81.3 |
| 176055 | 10/1965 | U.S.S.R. | 294/81.3 |
| 178077 | 1/1966 | U.S.S.R. | 294/81.3 |
| 770994 | 10/1980 | U.S.S.R. | 294/81.3 |
| 897690 | 1/1982 | U.S.S.R. | 294/81.4 |
| 1229168 | 5/1986 | U.S.S.R. | 294/81.3 |
| 1186738 | 4/1970 | United Kingdom | 294/81.3 |

Primary Examiner—Johnny D. Cherry
Attorney, Agent, or Firm—Oblon, Spivak, McClelland, Maier & Neustadt

[57] ABSTRACT

In a system for the tilting of a suspended object, this object is suspended from a suspension point by three suspension lines, the suspension lines being each fixed to the object by a fastening point. A suspension point is deflected and tautened by a roller. The tilting of the object is then achieved by the translation of the roller with respect to the object. This shifting is obtained, for example, by a pyrotechnical thrustor fixed to the object. Application: sub-munitions suspended from a parachute.

2 Claims, 4 Drawing Sheets

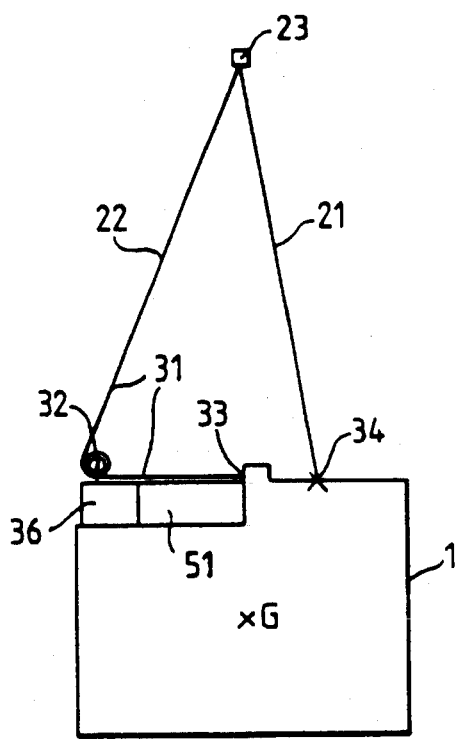
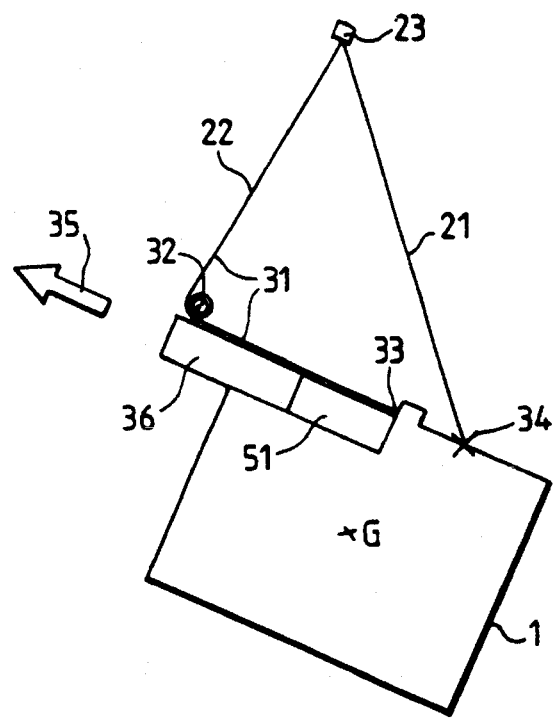
FIG. 3a    FIG. 3b
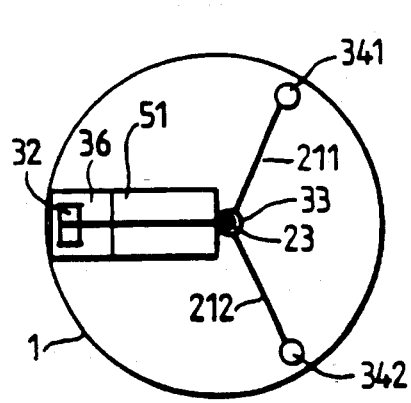
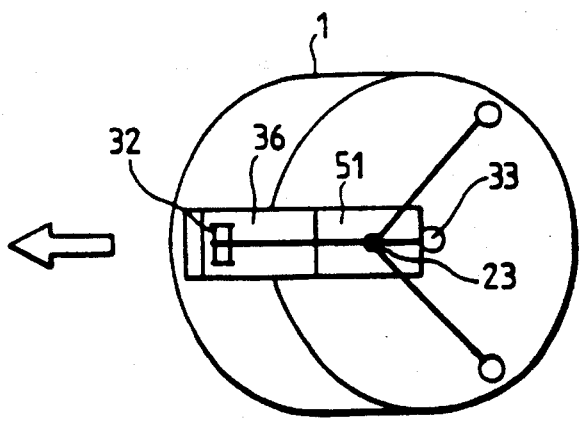
FIG. 4a    FIG. 4b ll # SYSTEM FOR THE TILTING OF A SUSPENDED OBJECT WITH TENSIONING ROLLER FOR SUSPENSION LINE This is a division, of application Ser. No. 07/999,352 filed on Dec. 31, 1992, now U.S. Pat. No. 5,398,613.

BACKGROUND OF THE INVENTION

The invention relates to a system for the tilting or inclining of an object suspended from suspension lines using a movable tensioning roller. It can be applied notably to sub-munitions of the "spiral scanning" type, fitted out with target sensors that activate the charge of the sub-munition, each sub-munition having a rotational motion and being suspended from a parachute at a given angle that is substantially constant to the vertical so as to enable the sensor to carry out a spiral scan of the ground while the sub-munition is falling. More generally, the invention can be applied to objects suspended from any suspension point which have to be provided with a variation of their tilt or inclination with respect to the vertical.

Initially, the axis of symmetry of the sub-munition is generally parallel to the vertical. To provide it with a given angle to the vertical, one commonly used approach consists in lengthening a portion of the suspension lines of the sub-munition, the other suspension lines keeping their length constant, so as to incline the sub-munition in using the energy developed by the tensile force or aerodynamic drag of the parachute. In order to improve the performance characteristics of anti-tank shells, it is desirable to increase the number of sub-munitions that they contain. This increase is difficult to achieve so long as the system for the tilting of each sub-munition remains bulky.

In order to obtain a precise tilting motion that is slow enough to avoid the triggering of troublesome swinging motions, the current approaches frequently use an intermediate movable mechanical system between the suspension lines and the sub-munition. This mechanical system provides for precise guiding and a limit-stop locking system. An approach such as this is described, for example, in the French patent application No. 2,642,159.

However, this type of approach may prove to be too cumbersome for certain embodiments.

SUMMARY OF THE INVENTION

The aim of the invention is to overcome the above-mentioned drawbacks.

To this end, an object of the invention is a system for the tilting of a suspended object, comprising at least three suspension lines and one suspension point, the object being suspended from the suspension point by the suspension lines, the suspension lines being each fixed to the suspension point and fixed to the object by fastening points, said system further comprising a roller and means for the shifting of the roller that are fixed to the object, a suspension line being deflected and tautened by the roller, the tilting of the object being achieved by the shifting of the roller in a motion controlled by the shifting means.

The main advantages of the system of the invention are that it is compact, enables the sub-munition to take up a given angle with respect to the vertical without any instability, is simple to implement and is economical.

BRIEF DESCRIPTION OF THE DRAWINGS

FIGS. 3a, 3b, 4a and 4b are drawings used to explain the tilting system according to the invention.

DESCRIPTION OF THE INVENTION

Figure 1:
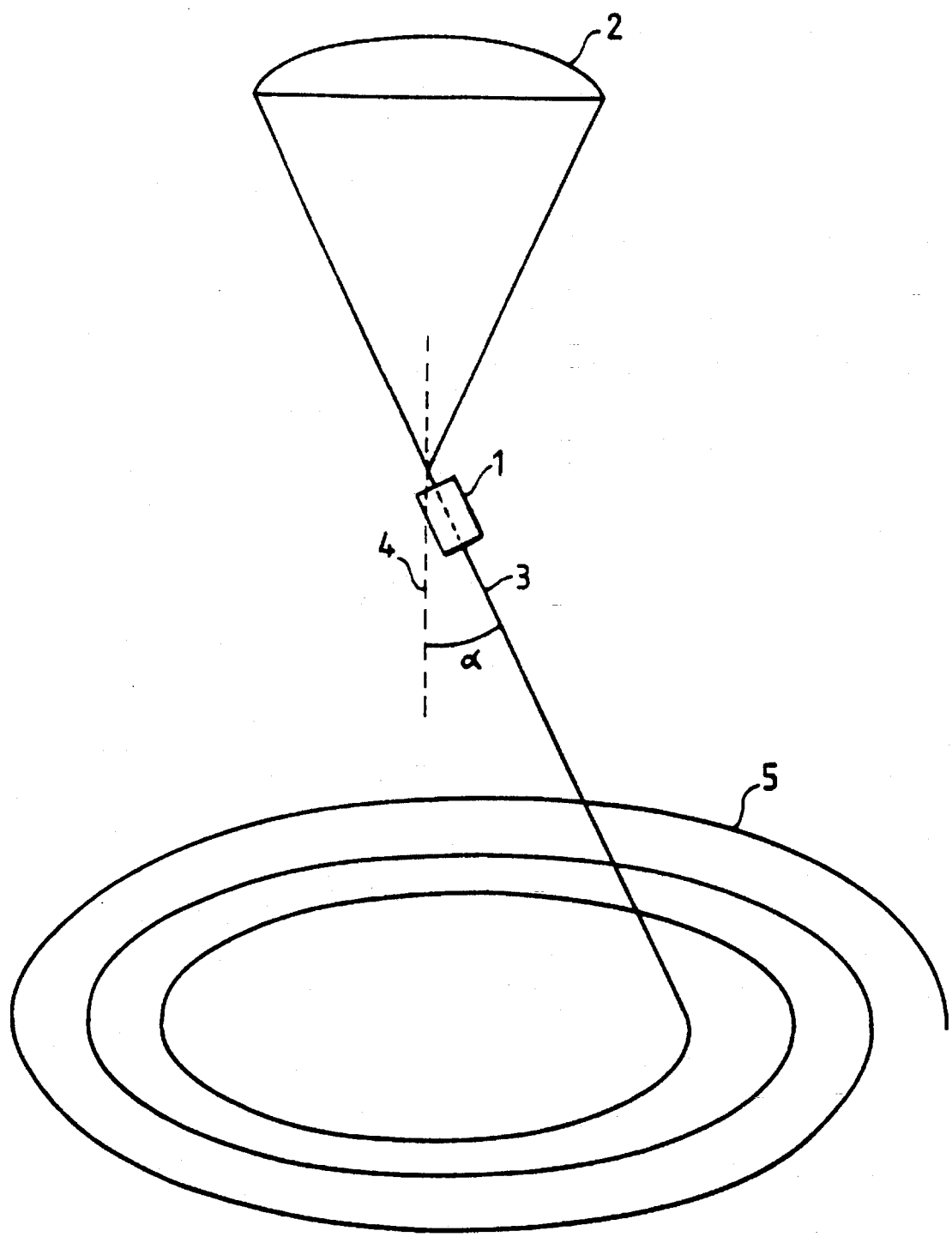
FIG. 1 illustrates the falling of a projectile suspended from a parachute along a given angle of inclination with respect to the vertical.

FIG. 1 illustrates the falling of a projectile 1, a sub-munition released from a shell for example. This projectile 1 is suspended from a parachute 2. The projectile 1 is fitted out, for example, with a sensor having an axis that is substantially oriented along the direction of the beam 3. This beam 3 forms a substantially constant angle a with the vertical symbolized by the broken line 4. During the fall of the object 1, the beam 3, driven by a rotational motion about the vertical, carries out a spiral scanning 5 on the ground.

Figure 2A:
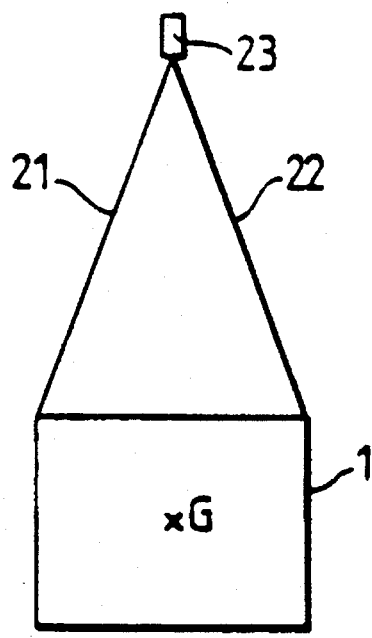
FIG. 2a shows a non-inclined suspended projectile.

FIG. 2a gives a schematic view of the position of a non-inclined, suspended object 1, for example, the position of the projectile 1 after the parachute 2 has unfolded and before the projectile has been tilted. The object 1 is suspended from a suspension point 23 by three suspension lines 21 and 22 with two suspension lines appearing in a superimposed position at 22. The object possesses a center of gravity, the position of which is referenced by the point G shown in projection in the plane of the figure.

Figure 2B:
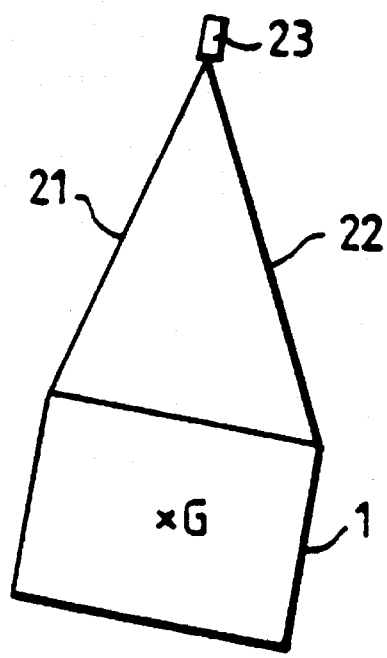
FIG. 2b is a drawing used to explain prior art systems for the tilting of a suspended projectile.

FIG. 2b is a drawing used to explain prior art systems for tilting the object 1, wherein one suspension line 21 is kept constant and at least one of the other two suspension lines 22 is lengthened. In this case, the position of the center of gravity G of the object is lowered in relation to its prior position. The tilting of the object 1 does not theoretically necessitate any energy here since, with the center of gravity G being lowered, the tilting can take place under the effect of a tensile force, that of a parachute for example. However, in certain applications, to prevent the effect of the tensile force from giving rise to a sudden tilting motion, mechanical devices have to be added to these systems in order to slow down and stabilize this tilting. This makes these systems complicated and, above all, it makes them far too bulky in certain cases of application.

FIGS. 3a and 3b illustrate the working of the tilting system according to the invention. In FIG. 3a, the object 1 is still suspended from a suspension point 23 by means of two suspension lines 21 seen in a superimposed position in the figure and by means of a third suspension line 31. The first suspension lines 21 are fixed to the object at two fastening points 34 and the third suspension line 31 is fixed to the object at a fastening point 33. Between the suspension point 23 and the fastening point 33, the third suspension line 31 is deflected and tautened by a roller 32. The action of the suspension line 31 on the object 1 is therefore equivalent to the action of a theoretical suspension line 22 that would directly connect the suspension point 23 to a fastening point occupying the position of the roller 32.

FIG. 3b shows the object 1 in an inclined position. According to the invention, this inclination is achieved through the shifting of the roller 32 by a translational motion along the arrow 35 in such a way as to move the theoretical suspension line 22 away. Since the length of the suspension line 31 is fixed, the shifting of roller 32 is equivalent to a reduction of the length of the theoretical suspension line 22. Consequently, the object 1 undergoes a tilting motion. Advantageously, this tilting motion can be controlled by the shifting of the roller, this shifting being prompted by shifting means 51 that are fixedly joined to the object to be tilted. Since energy is needed to raise the center of gravity G against the effect of the force of gravity, these shifting means have to be activated by a source of energy. The means for shifting the roller 32 can be formed, for example, by a spring whose decompression sets in motion the stroke of a piston 36 that is fixedly joined to the roller 32. They may also be constituted by a pyrotechnical actuator or thrustor, the stroke of the piston of this thrustor, which is fixedly joined to the roller 32, being preferably dampened. These means furthermore contain a locking device that can be used to keep the position of the roller 32 constant, i.e., to preserve the inclined position of the object. The use of a pyrotechnical thrustor provides an advantage wherein this thrustor is very compact. Finally, these means have the advantage wherein they can be used for other functions, especially in the case of an anti-tank sub-munition, where these means for shifting the roller may be used simultaneously to deploy the optical system of an infra-red sensor, for example, on which the roller can be fixed.

FIGS. 4a and 4b, respectively, show top views of FIGS. 3a and 3b. The object is suspended from a suspension point 23 by three suspension lines 211, 212, 31. The suspension lines 21 of the previous figures are referenced 211 and 212 in the present figures. Of these suspension lines, one is fixed to a fastening point 341 and the other to a fastening point 342. The suspension line 31 is fixed to the suspension point 23 and to the fastening point 33. It is deflected by the roller 32. The points 341, 342 and the roller 32 form, for example, an isosceles triangle. The sides formed, firstly, by the points 341 and 32 and, secondly, by the points 342 and 32, are then equal. The object 1 is provided with shifting means 51 that can be used to hold the roller 32 and shift it. The roller 32 may be, for example, a pulley. The shifting means 51 may be, for example, a thrustor, notably a pyrotechnic thrustor, the piston 36 of which is fixedly joined, mechanically, to the pulley 32, the thrustor itself being fixed for example to the object 1. The thrustor 51 gives the energy needed for the shifting of the pulley 32, i.e., in fact for the raising of the center of gravity G of the object 1.

For this tilt to remain stable, the thrustor keeps its position at the end of its course by means of a locking device. The shifting of the thrustor may be preferably controlled. In particular, it may be a slow shift, provided that the thrustor has internal damping means if it is pyrotechnical. This enables the object 1 to take up a tilting position without sudden motions liable to cause instability. The triggering of the thrustor may be controlled according to a predetermined delay. The suspension lines 31, 211, 212 may be strips of a material that is non-extensile or has little extensibility, this material being made of aromatic polyamide for example. For reasons related to the amount of space occupied, the fastening point 33 may be out of alignment with respect to the suspension point 23 and the pulley 32. Indeed, in certain cases, this fastening point 33 cannot be placed under the thrustor 51, especially if this thrustor 51 is fixed very close to the top of the object 1, or even if it is fixed to the top of the object. This is the case notably when it is necessary to reduce the overall height of the object 1. The off-alignment of the fastening point 33 in no way prevents the object from tilting according to the invention through the shifting of the pulley 32. It is necessary, however, for the pulley to be oriented along a bisectrix of the two parts of the suspension line located on either side of the pulley in order to prevent the risks of friction and blocking.

In the embodiment of FIGS. 4a and 4b, the shifting means that provide for the shifting of the pulley 32 have been given, by way of an example, in the form of an thrustor, notably a pyrotechnical thrustor, but this thrustor can be replaced by other devices, especially by spring-based systems.

Figure 5A:
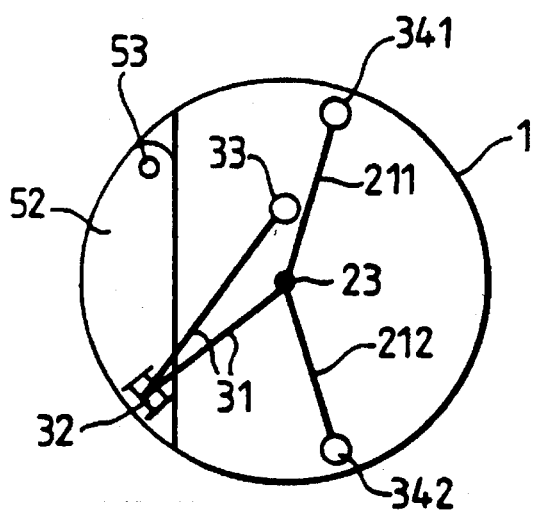
FIGS. 5a and 5b show a variant of the above-mentioned embodiment.
Figure 5B:
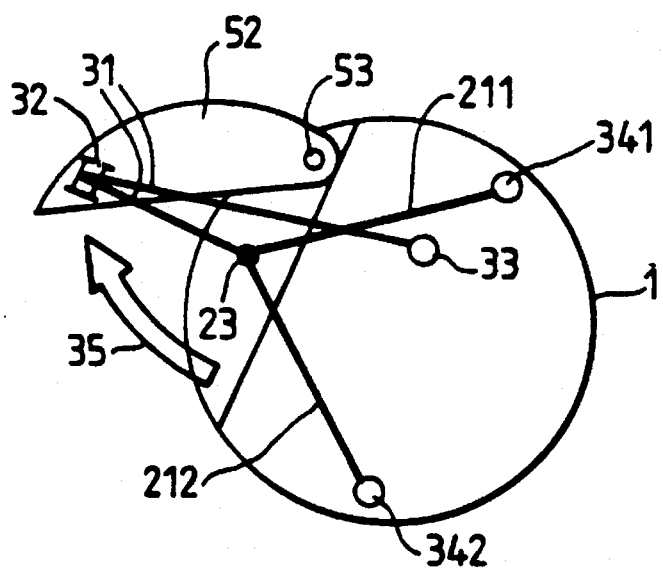

FIGS. 5a and 5b show another type of embodiment in which the roller 32 is fixed to an element, for example an infra-red optical system 52 pivoting about a point 53 fixedly joined to the object 1.

These figures are homologous to the FIGS. 4a and 4b. The thrustor for the deployment of the pivoting element 52 and of the roller 32 has not been shown. In this case, the fixing point 33 is out of alignment with respect to the suspension point 23 and to the roller 32.

What is claimed is:

1. A system for the tilting of a suspended object, comprising at least three suspension lines and one suspension point, said object being suspended from said suspension point by said suspension lines, said suspension lines being each fixed to said suspension point at one end and fixed at the other end to said object, said system further comprising a roller and means fixed to said object for shifting said roller toward and away from said object, one of said suspension lines being located in the path of travel of said roller and deflected by said roller when the roller is moved away from said object, the deflection of said one suspension line by said roller causing tilting of said object from an initial position to a second position.

2. A system according to claim 1, where in the means for shifting the roller that deflects said one suspension line is constituted by a thruster fixed to said object, said thruster including a piston, said roller being fixedly joined to said piston of said thruster, an element pivotedly attached at a point on said object, said roller being fixedly attached to said piston through said element and said element being capable of shifting in a rotational motion under the effect of said thruster.

* * * * *